United States Patent [19]

Abuyama

[11] Patent Number: 5,144,452
[45] Date of Patent: Sep. 1, 1992

[54] IMAGE FORMING APPARATUS IN WHICH IS CALCULATED THE NUMBER OF IMAGES AT A GIVEN MAGNIFICATION TO DUPLICATE REPEATEDLY ON A GIVEN SIZE RECORDING MEDIUM WITHOUT INTERFERENCE

[75] Inventor: Yasuo Abuyama, Kanagawa, Japan

[73] Assignee: Kabushiki Kaisha Toshiba, Kawasaki, Japan

[21] Appl. No.: 694,760

[22] Filed: May 2, 1991

[30] Foreign Application Priority Data

May 14, 1990 [JP] Japan ................................. 2-123764

[51] Int. Cl.⁵ .......................... H04N 1/23; H04N 1/393
[52] U.S. Cl. ..................................... 358/296; 358/401; 358/450; 358/451
[58] Field of Search ............... 358/296, 401, 451, 449, 358/450, 452, 453

[56] References Cited

U.S. PATENT DOCUMENTS

| | | | |
|---|---|---|---|
| 4,893,194 | 1/1990 | Sakata | 358/451 |
| 4,899,227 | 2/1990 | Yamada | 358/451 |
| 4,947,269 | 8/1990 | Yamada | 358/451 |

*Primary Examiner*—Benjamin R. Fuller
*Assistant Examiner*—Scott A. Rogers
*Attorney, Agent, or Firm*—Foley & Lardner

[57] ABSTRACT

An image forming apparatus having an image reading device for receiving image information from an original, an image duplicating device for duplicating an image corresponding to the received image information on a recording medium such as a paper sheet, a magnification rate key for providing a magnification rate with respect to the received image information, a microprocessor for calculating the number of images possible to duplicate on the one paper sheet by the image duplicating device, based on the size of the received image information, the size of the paper sheet and the provided magnification rate and a controller for controlling the image duplicating device to repeatedly perform the image duplicating operation of the number calculated by the microprocessor, such that the image duplicating device duplicates the image of the calculated number on the one paper sheet at the provided magnification rate.

6 Claims, 7 Drawing Sheets

IMAGE FORMING APPARATUS IN WHICH IS CALCULATED THE NUMBER OF IMAGES AT A GIVEN MAGNIFICATION TO DUPLICATE REPEATEDLY ON A GIVEN SIZE RECORDING MEDIUM WITHOUT INTERFERENCE

FIELD OF THE INVENTION

The present invention relates generally to an image forming apparatus, more particularly, to an image forming apparatus suitable for use in a thermal printing type copying equipment.

BACKGROUND OF THE INVENTION

In a conventional image forming apparatus, a type of copying equipment produces a predetermined number of duplicated images on a single sheet from the same original. In this type of copying equipment, there is an equipment which is further able to suitably arrange a predetermined number of such duplicated images on the single sheet by aligning them both in the X-coordinate direction and the Y-coordinate direction.

In the conventional image forming apparatus, however, it is difficult for an operator to acknowledge how many such duplicated images can be produced on a given sheet. Thus, it frequently occurred that a relatively large area of a given sheet uselessly remains empty, even though the empty space would have sufficient room for accommodating a number of such duplicated images.

SUMMARY OF THE INVENTION

It is, therefore, an object of the present invention to provide an image forming apparatus able to acknowledge to an operator the available number of duplicated images which the apparatus can produce on a given sheet.

It is also an object of the present invention to inexpensively provide such an image forming apparatus.

In order to achieve the above objects, an image forming apparatus according to one aspect of the present invention has an image reading device for receiving an image information from an original, an image duplicating device for duplicating an image corresponding to the received image information on a recording medium such as a paper sheet, a magnification rate key for providing a magnification rate with respect to the received image information, a microprocessor for calculating the number of the image possible to duplicate on the one paper sheet by the image duplicating device, based on the size of the received image information, the size of the paper sheet and the provided magnification rate and a controller for controlling the image duplicating device to repeatedly perform the image duplicating operation of the number calculated by the microprocessor, such that the image duplicating device duplicates the image of the calculated number on the one paper sheet at the provided magnification rate.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
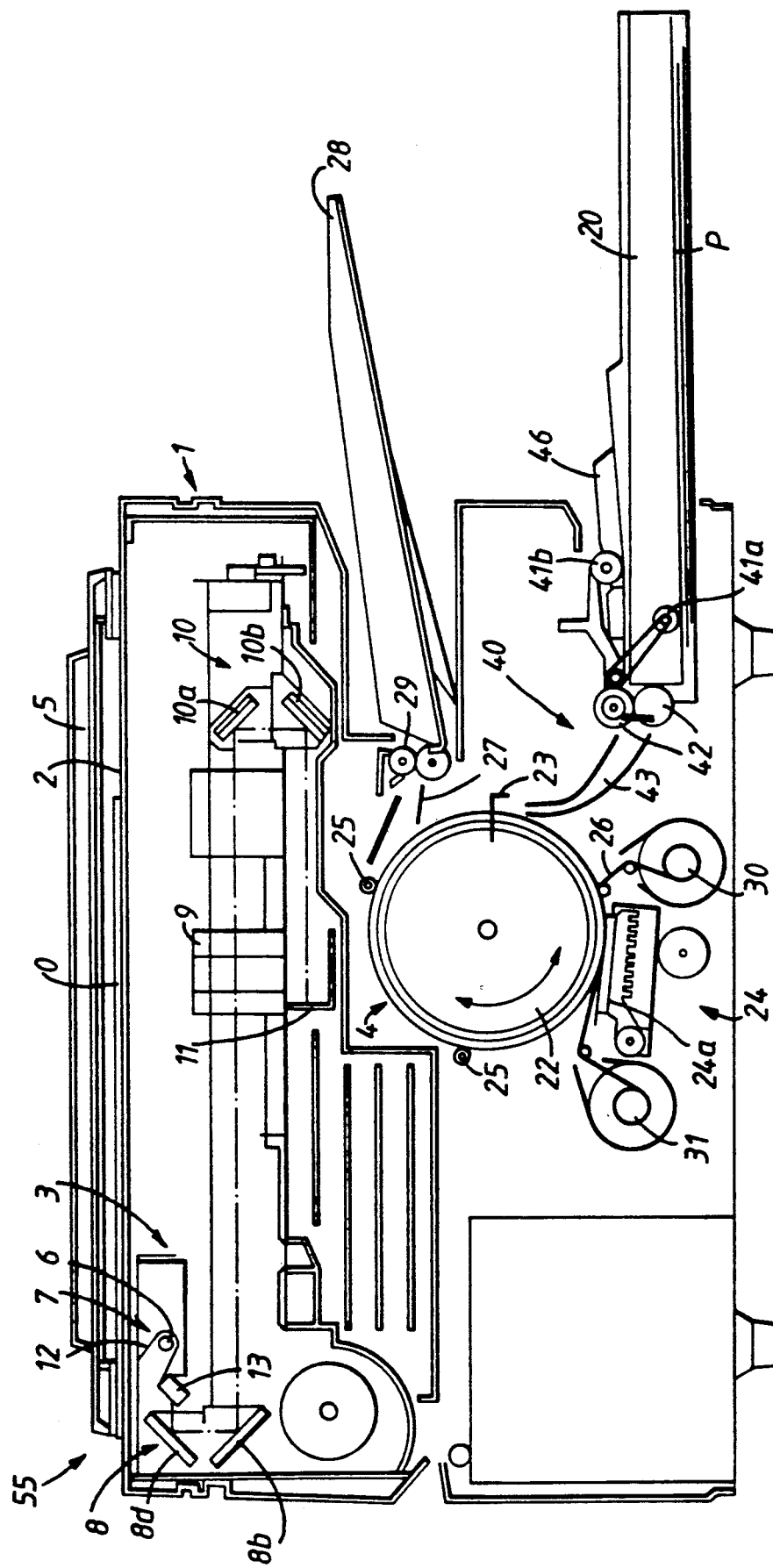
FIG. 1 is a longitudinal section of an image forming apparatus according to an embodiment of the present invention.

The present invention will be described in detail with reference to the FIGS. 1 through 7. Throughout the drawings, like or equivalent reference numerals or letters will be used to designate like or equivalent elements, for simplicity of explanation.

Referring now to FIG. 1, the basic construction of the image forming apparatus according to the present invention will be described in detail. FIG. 1 shows a thermal printing type copying equipment which produces color copies as well as monochrome copies, as an embodiment of the image forming apparatus.

In FIG. 1, the copying equipment has a main body 1, a platen glass 2, an image reading section 3, an image forming section 4 and a platen cover 5. The main body 1 accommodates the image forming section 4. The platen glass 2 is mounted on the top of the main body 1, for laying thereon an original O to be copied. The main body 1 also has a control panel 80 in the front top corner of the body 1 near the platen glass 2. The control panel 80 will be described later in reference to FIG. 2.

The control panel is typically equipped with a ten-key pad, a display 100 for displaying numerals and/or characters, a copy key, a magnification rate inputting key, etc. The ten-key pad is used for indicating a desired duplicating number of images. The copy key is used for starting the copy operation of the apparatus. The magnification rate inputting key is used for magnifying up (enlarging) or down (reducing) the image the original O.

The platen cover 5 is hinged to the rear top corner of the body 1. Thus, the platen cover 5 can be lowered to a lowered position or raised to a raised position. In the lowered position, the platen cover 5 can press the original O against the platen glass 2, while in the raised position the platen cover allows an operator to locate or replace the original O on or from the platen glass 2. The details of the image forming section 4 will be described below.

The main body 1 is further provided with a pair of sheet trays, i.e., a first tray 20 for feeding a piece of paper sheets P stacked therein to be used for carrying duplicated images and a second tray 28 for receiving a copied paper sheet P. The trays 20 and 28 are removably fitted in openings defined in one side of the main body 1. Further a third tray 46 is formed on a lid of the first tray 20. The tray 46 is used for temporarily feeding a paper sheet laid thereon by manual operation.

A paper sheet feeding section 40 is disposed in the main body 1 for selectively feeding the paper sheet P from either the first tray 20 or the third tray 46 to the image forming section 4. The paper sheet feeding section 40 comprises a pair of first and second takeup rollers 41a and 41b, an aligning roller pair 42 and a feeding guide 43. The first takeup roller 41a takes up a paper sheet P one by one from the stack of the paper sheets on the first tray 20. When a paper sheet P is temporarily laid on the third tray 46, the second takeup roller 41b operates with priority to the other takeup roller 41a. Thus, a paper sheet P is fed from either the first tray 20 or the third tray 46 to the image forming section 4 through the aligning roller pair 42 and the feeding guide 43. The aligning roller pair 42 is disposed between an inlet port of the feeding guide 43 and the set of first and third trays 20 and 46. An outlet port of the feeding guide 43 faces the platen drum 22 of the image forming section 4. The platen drum 22 will be discussed in detail later.

When the image forming section 4 has completed a copying operation on the paper sheet P, the paper sheet P is output to the second tray 28 through an ejecting guide 27 and an ejecting roller pair 29, which are disposed between the platen drum 22 and the second tray 28.

The image reading section 3 comprises a first carriage 7, a second carriage 8, a lens 9, a stationary mirror assembly 10 and a phototransducer 11.

The first carriage 7 comprises an exposure lamp 6, a parabolic reflector 12 and a first mirror 13. The exposure lamp 6 radiates light onto the original O laid on the platen glass 3. The parabolic reflector 12 reflects the light emitted from the exposure lamp 6 to the original O in an oblique direction, thus the light reflected from the original O is applied to the first mirror 13. The first mirror 13 then applies the light to the second carriage 8.

The second carriage 8 comprises second and third mirrors 8a and 8b. While the stationary mirror assembly 10 comprises a fourth and a fifth mirror 10a and 10b. The lens 9 is disposed between the third mirror 8b of the second carriage 8 and the fourth mirror 10a of the stationary mirror assembly 10. The phototransducer 11 is disposed in front of the fifth mirror 10b of the stationary mirror assembly 10. Thus, the light reflected from the original O reaches the phototransducer 11 through the first mirror 13, the second mirror 8a, the third mirror 8b, the lens 9, the fourth mirror 10a and the fifth mirror 10b, in turn.

The first and second carriages 7 and 8 travel along the platen glass 2 in synchronism with each other, rightwardly in the drawing of FIG. 1 for optically scanning the original O on the platen glass 2. The first carriage 7 travels over the entire length of the platen glass 2 at a first speed, while the second carriage 8 moves for a half distance of the first carriage 7 and at a half speed of the first carriage 7. Thus, the light passing from the radiated portion of the original O to the phototransducer 11 is kept constant.

The distance between the lens 9 and the mirror assembly 10 is adjustable for magnifying up or down an optical image on the phototransducer 11. The relative positions of the lens 9 and the mirror assembly 10 are shifted by separate stepping motors (not shown) in response to a desired magnification rate. The magnification rate is controlled by the magnification rate inputting key on the control panel as described above. Those skilled in the art will appreciate that the magnifying operation can be made by using a conventional variable zoom lens, in place of adjusting the positions of the lens 9 and the mirror assembly 10.

The phototransducer 11 transduces the light originating from the original O into an electrical signal, i.e., an image signal. The phototransducer 11 comprises a conventional CCD (Charge Coupled Device) line image sensor. The CCD (Charge Coupled Device) line image sensor is provided with a plurality of CCD elements, thereby a set of three CCD elements correspond to an image pixel of the original O. Thus, for example, the set of three CCD elements generates a set of three color signals, i.e., a set of Cyan, Green and Yellow, or a set of Red, Green and Blue, in response to the image pixel. The color signals are applied to a thermal printer 24 of the image forming section 4, after an implementation of a predetermined image processing as described later in detail.

The image forming section 4 comprises the platen drum 22, a fastener 23, a set of pressure rollers 25 and the thermal printer 24. The platen drum 22 is rotatably disposed in substantially the center of the main body 1. Thus, the platen drum 22 faces the outlet port of the feeding guide 43 and an inlet port of the ejecting guide 27.

The fastener 23 is provided on the platen drum 22. The fastener 23 faces the outlet port of the feeding guide 43 when the platen drum 22 stays in suspension. The fastener 23 then fastens the leading end of the paper sheet P to the peripheral of the platen drum 22 when the paper sheet P is fed to the image forming section 4. Then the platen drum 22 rotates in the counterclockwise direction in the drawing so that the paper sheet P is wound on the periphery of the platen drum 22. The pressure rollers 25 press the paper sheet P against the platen drum 22 so that the entire portion of the paper sheet P is kept in contact with the platen drum 22.

The thermal printer 24 is disposed in a position beneath the platen drum 22 and in the neighborhood of the paper sheet feeding section 40. The thermal printer 24 becomes ready to carry out a printing operation on the paper sheet P when the leading end of the paper sheet P passes over the thermal printer 24 by a predetermined length and thus the loading of the paper sheet P onto the platen drum 22 is completed.

The thermal printer 24 comprises a thermal head 24a and a pair of reels, i.e., a supply reel 30 and a takeup reel 31. The reels 30 and 31 drives therebetween an ink ribbon which runs in a gap between the platen drum 22 and the thermal head 24a, during the printing operation.

In this printing operation, the platen drum 22 again rotates in the counterclockwise direction, so that the printing operation progresses along the longitudinal direction of the paper sheet P. When the printing operation is completed, the platen drum 22 rotates in the reverse direction, i.e., the clockwise direction. Then, the paper sheet P is ejected from the platen drum 22 by the trailing end of the paper sheet P engaging with an unfastening fluke (not shown) disposed near the ejecting guide 27. Further, the fastener 23 releases the leading end of the paper sheet P when the fastener 23 has reached near the ejecting guide 27 during the ejecting operation.

The unfastening fluke selectively operates to engage with the trailing end of the paper sheet P. Thus, the unfastening fluke is kept in condition so as not to engage the paper sheet P, if the trailing end of the paper sheet P has reached the unfastening fluke in the course of a color printing operation, as described below.

In case of the monochrome printing, the paper sheet P after carrying out such a printing operation is ejected by the clockwise rotation of the drum 22 onto the second tray 28. In case of the color printing, the counterclockwise rotation and the clockwise rotation are repeated, e.g., three times. While a colored ink ribbon in which three segments of, e.g., Cyan, Green and Yellow are alternately aligned along the ribbon is provided and each segment is supplied in turn to the thermal head 24a in synchronism with the rotation change of the platen drum 22.

Figure 2:
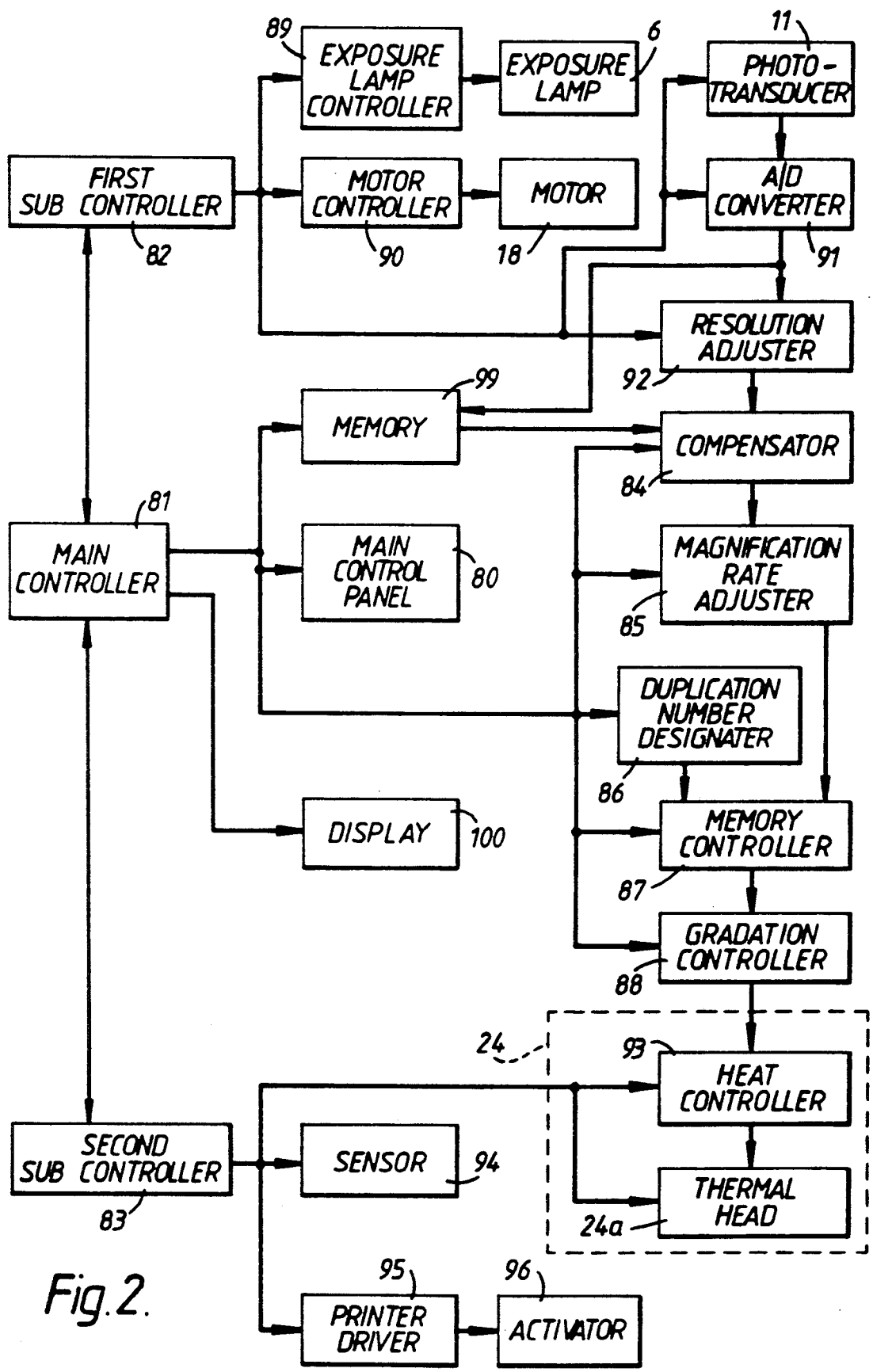
FIG. 2 is a block diagram showing a control system of the apparatus of FIG. 1.

Referring now to FIG. 2, the control system of the image forming apparatus will be discussed. FIG. 2 shows a block diagram of the control system. In FIG. 2, the control system comprises a main controller 81 and a pair of first and second sub controllers 82 and 83 which are coupled with each other with the main controller 81 as the center. These controllers 80, 81 and 82 are typically constituted by a conventional microcomputer.

The main controller 81 is coupled to a main control panel 80, a memory 99, a compensator 84, a magnification rate adjuster 85, a duplication number designator 86, a memory controller 87, a gradation controller 88 and a display 100 for controlling them.

The first sub controller 82 is coupled to an exposure lamp controller 89, a motor controller 90, the phototransducer 11 as shown in FIG. 1, an A/D (analog to digital) converter 91 and a resolution adjuster 92 for controlling them. The exposure lamp controller 89 is coupled to the exposure lamp 6 for controlling its turn ON and OFF and further its intensity if necessary. The motor controller 90 is coupled to a motor 18 for driving the first and second carriages 7 and 8. The A/D converter 91 converts the image signal output from the phototransducer 11 into a digital image signal. The resolution adjuster 92 processes the digital image signal from the A/D converter 91 under the control of the first sub controller 82, so that the resultant image is adjusted in resolution.

The second sub controller 83 is coupled to the thermal head 24a, a heat controller 93 for controlling the temperature of the thermal head 24a, a variety of sensors 94 and a printer driver 95. The printer driver 95 is coupled to an activater such as a solenoid (not shown) of the thermal head 24a and a motor (not shown) for driving the takeup reel 31.

The memory 99 stores reference data for shading compensation and is coupled to the compensator 84 for supplying the compensator 84 with the reference data. The compensator 84 normalizes the digital image signal output after processing by the resolution adjuster 92 in reference with the reference data. As a result, shading caused by non-uniformity of the CCD elements of the phototransducer 11 is compensated for.

Figure 3:
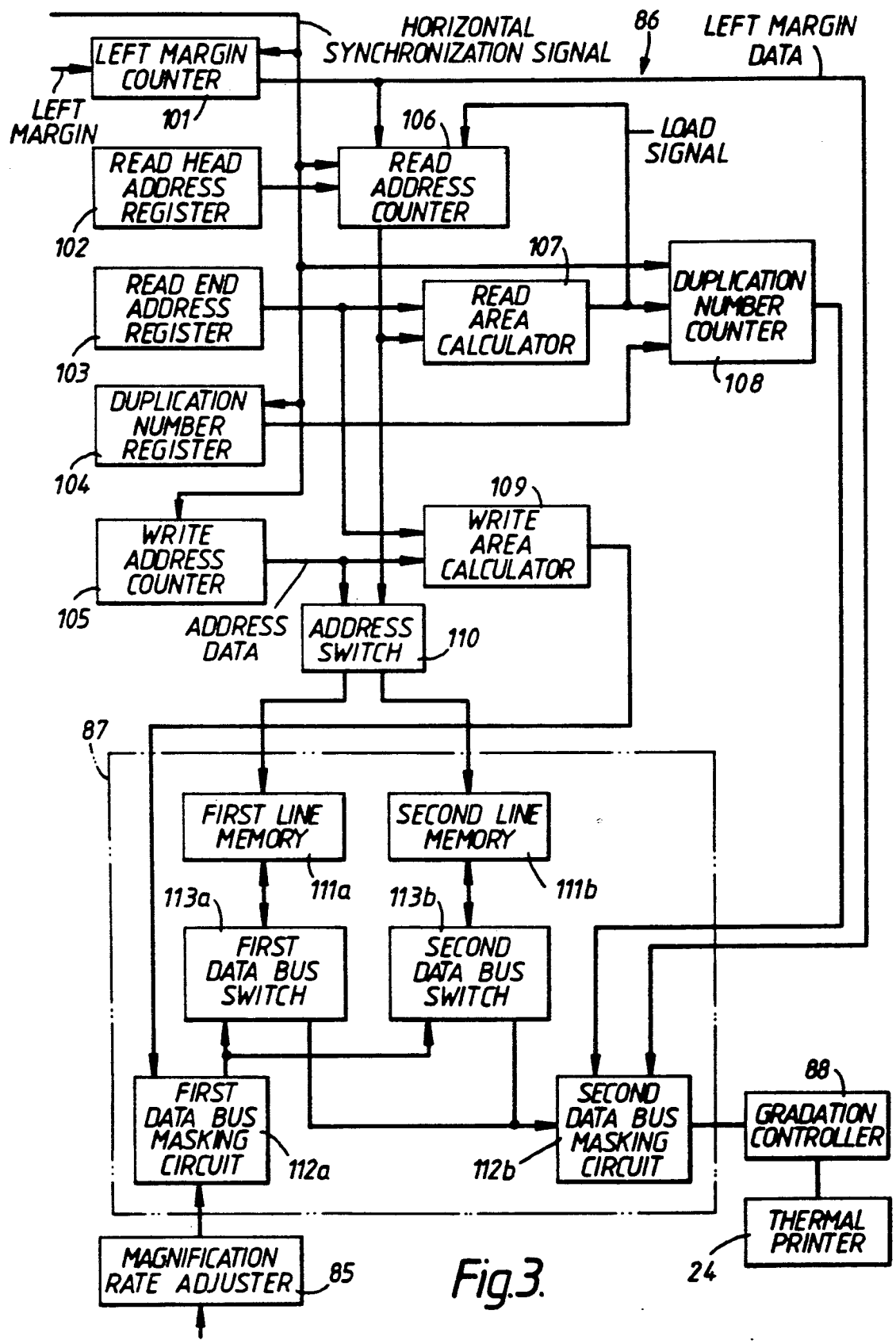
FIG. 3 is a block diagram showing the details of the duplication number designator of FIG. 1.

Referring now to FIG. 3, the duplication number designator 86 and the memory controller 87 will be discussed in detail below. FIG. 3 shows a block diagram of the duplication number designator 86 and the memory controller 87.

In FIG. 3, the duplication number designator 86 comprises a left margin counter 101, a read head address register 102, a read end address register 103, a duplication number register 104, a write address counter 105, a read address counter 106, a read area calculator 107, a duplication number counter 108, a write area calculator 109 and an address switch 110.

The memory controller 87 comprises a pair of first and second line memories 111a and 111b, a pair of first and second data masking circuits 112a and 112b and a pair of first and second data bus switches 113a and 113b.

The left margin counter 101 counts a left margin for outputting a left margin data under the control of a horizontal synchronous signal. The left margin data presents a starting end where the image reading section 3 (see FIG. 1) can start scanning an original O to be processed. The read head address register 102 stores a read head address for applying to the image reading section 3. The read end address register 103 stores a read end address RE for applying to the image reading section 3. The duplication number register 104 stores a duplication number designated by an operator through the ten-key pad of the control panel 80 (see FIG. 2).

The write address counter 105 outputs a write address for a pair of first and second line memories 111a and 111b. The read address counter 106 outputs a read address for the pair of first and second line memories 111a and 111b. The read address is defined in response to the left margin from the left margin counter 101, the horizontal synchronous signal and the read head address from the read head address register 102.

The read area calculator 107 compares the read end address RE and the read end address register 103, and the read address and the read address counter 106, for outputting a read area data. The duplication number counter 108 outputs a second mask signal and a load signal in response to the read end address RE from the read end address register 103, the horizontal synchronous signal and the duplication number from the duplication number register 104. The second mask signal is applied to the second data masking circuit 112b. The load signal is applied to the read address counter 106.

The write area calculator 109 compares the read end address RE and the read end address register 103, and the write address and the write address counter 105, for outputting a first mask signal to the first data masking circuit 112a. The address switch 110 selects the write address from the write address counter 105 and the read address from the read address counter 106 for applying to the memory controller 87. The write address or the read address is alternately applied to the first and second line memories 111a and 111b.

In the memory controller 87, the first and second line memories 111a and 111b alternate their read phase and write phase in the reverse relation with each other. For example, the second line memory 111b is in the write phase when the first line memory 111a is in the read phase.

The first data masking circuit 112a masks the digital image signal applied through the magnification rate adjuster 85 in response to the first mask signal from the write area calculator 109. The second data masking circuit 112b masks the digital image signal output of the memory controller 87 to the thermal printer 24 through the gradation controller 88 in response to the left margin data from the left margin counter 101 and the second mask signal from the duplication number counter 108.

The first and second data bus switches 113a and 113b alternately switch the data buses of the first and second line memories 111a and 111b. Thus, the second line memory 111b outputs its memory data to the second data masking circuit 112b when the first line memory 111a is in the write phase. While, the first line memory 111a outputs its memory data to the second data masking circuit 112b when the second line memory 111a is in the write phase.

Figure 4:
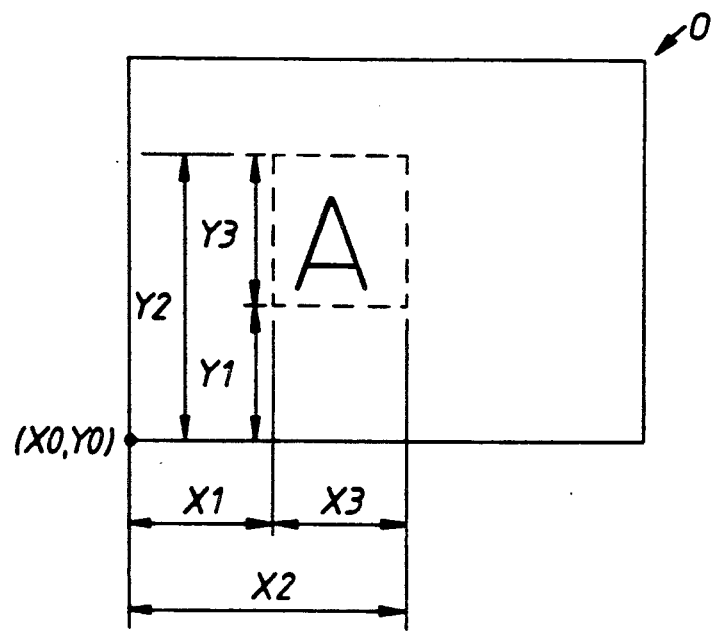
FIG. 4 is a plan view of an original conveying an image a for a image processing according to the present invention.
Figure 5:
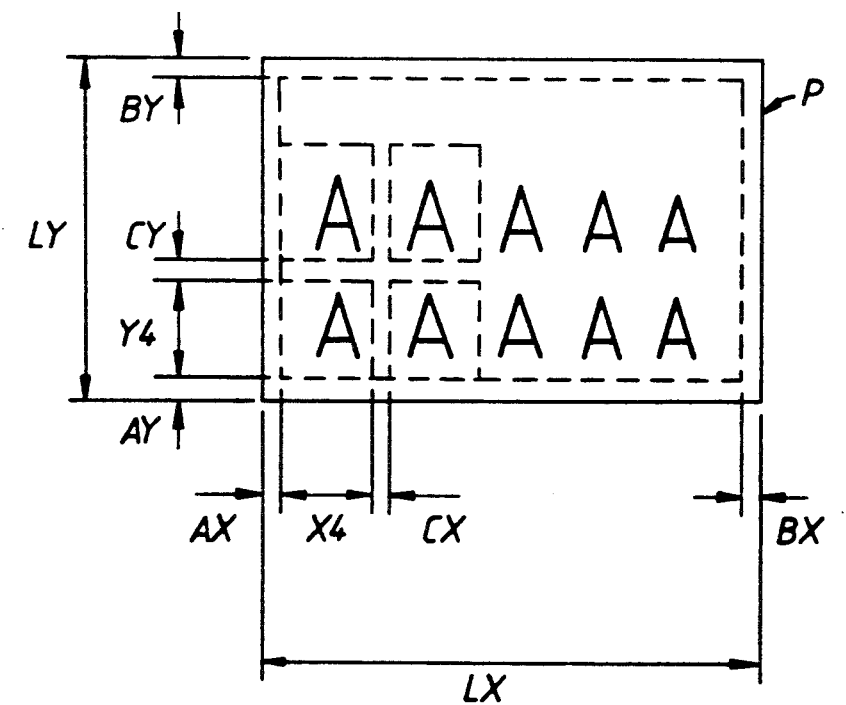
FIG. 5 is a plan view of a paper sheet to be served for carrying duplicated images.
Figure 6:
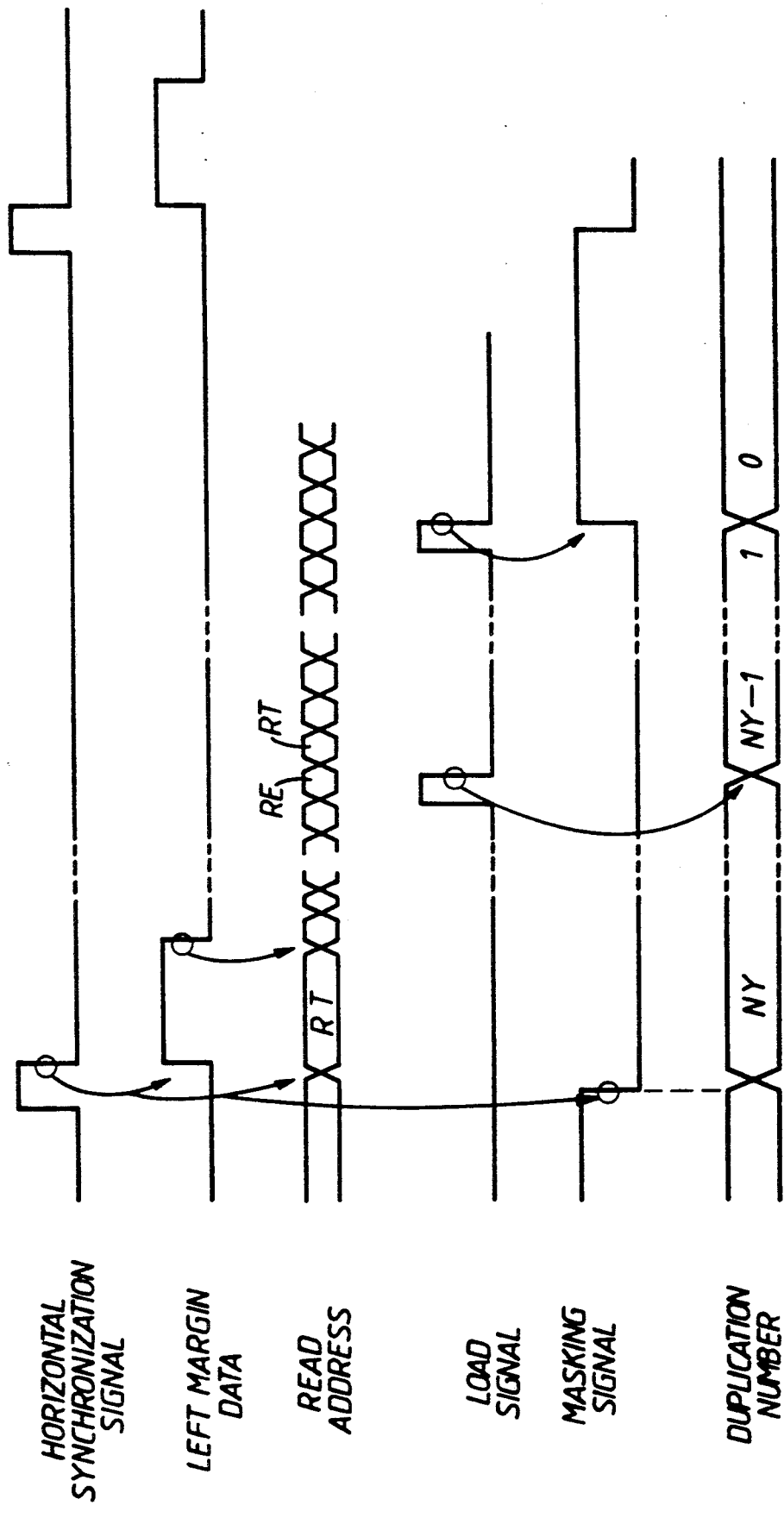
FIG. 6 is a timing chart of the signals in the control system of FIG. 2.
Figure 7A:
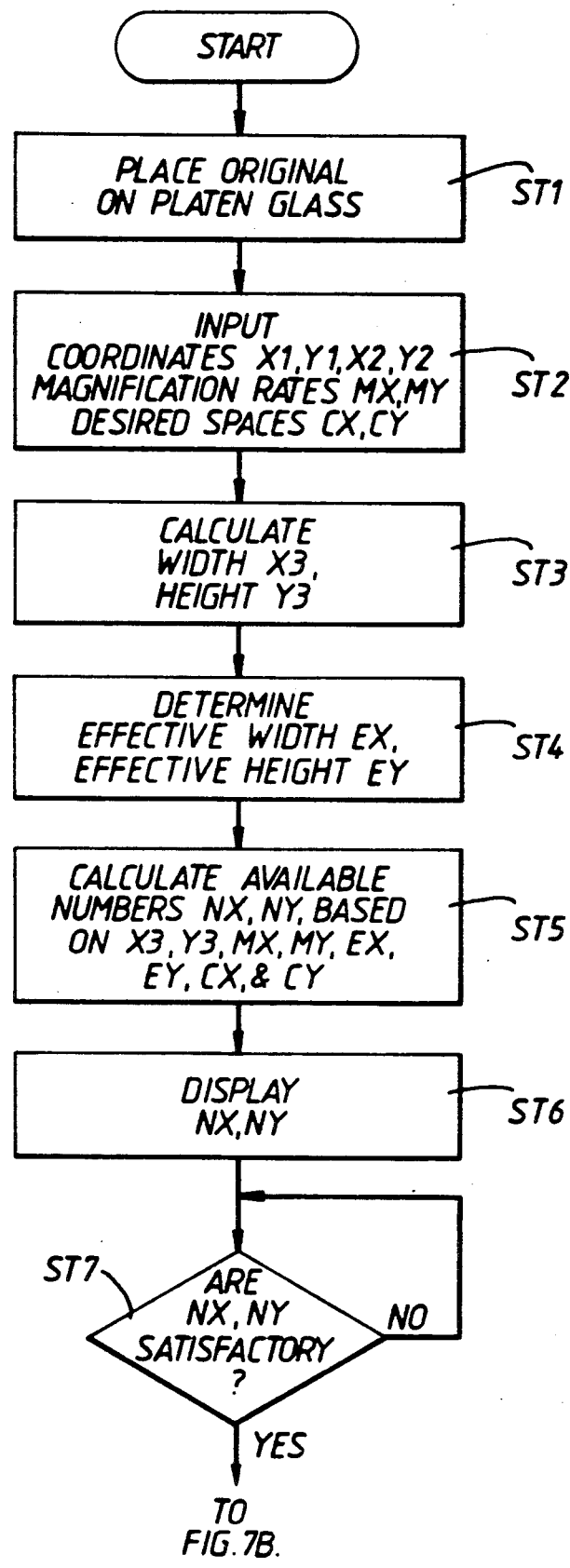
FIG. 7 is a flow chart of an operation sequence according to the present invention.
Figure 7B:
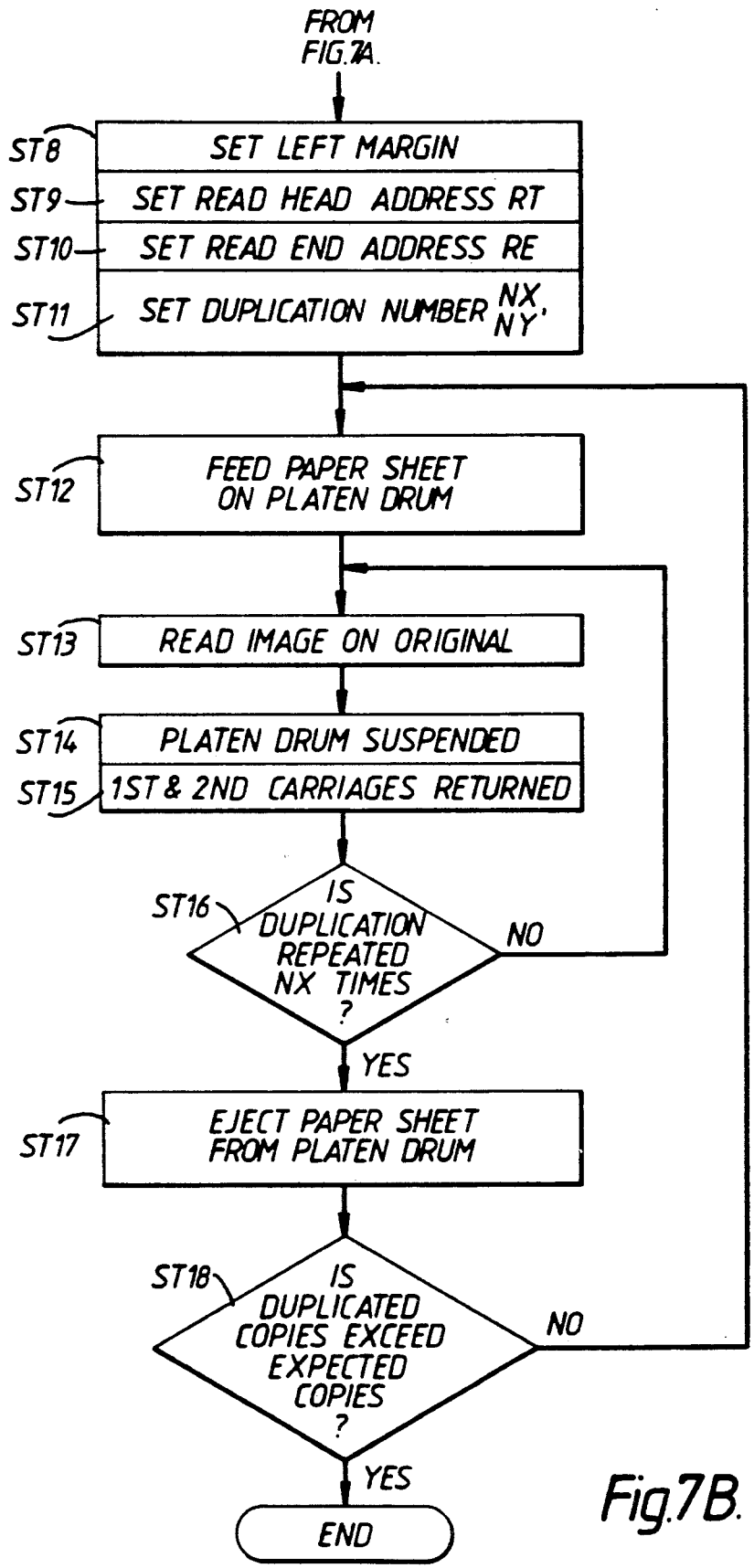

Referring now to FIGS. 4 through 7, an exemplified copy operation of an original O to a paper sheet P for producing a predetermined number of duplications is illustrated. FIG. 4 shows a plan view of the original O conveying an exemplified character image "A". FIG. 5 shows a plan view of the paper sheet to be used for carrying the duplication copies of the character image "A". FIG. 6 shows a timing chart of signals and/or data in the control system of FIGS. 2 and 3. FIG. 7 explains a flow chart of the operation sequence carried out in this exemplified copy operation.

At a beginning of such a copy operation, an operator places the original O on the platen glass 2 (see FIG. 1) of the apparatus (ST1). Then the operator inputs four coordinates X1, Y1, X2 and Y2 on the original O (see FIG. 4) for designating a suitable image area including the character image "A", desired magnification rate MX and MY in the width direction and the height direction and desired spaces CX and CY (see FIG. 5) through the control panel 80 (ST2).

The main controller 81 calculates a width X3 and a height Y3 of the image area (ST3). The width X3 and the height Y3 are given by following equations (1) and (2).

$$X3 = X2 - X1 \tag{1}$$

$$Y3 = Y2 - Y1 \tag{2}$$

The main controller 81 then determines an effective width EX and an effective height EY indicating an effective copy area available for carrying copied images on the paper sheet P according to prescribed dimensions LX, AX, BX, LY, AY and BY (see FIG. 5) of the paper sheet P (ST4). Here, actual data of such dimensions LX, AX, BX, LY, AY and BY have been given in accordance with the standard sizes of paper sheets such as the A4 size etc., and previously stored in the memory 99. The effective width EX and the effective height EY are given by following equations (3) and (4).

$$EX = LX - AX - BX \tag{3}$$

$$EY = LY - AY - BY \tag{4}$$

The main controller 81 further calculates a width X4 and a height Y4 of each copy area of duplicated copies in accordance with the width X3 and the height Y3 of the image area and the designated magnification rate MX and MY (ST4). The width X4 and the height Y4 are given by following equations (5) and (6).

$$X4 = MX \times X3 \tag{5}$$

$$Y4 = MY \times Y3 \tag{6}$$

The main controller 81 further calculates available duplication numbers NX and NY of copies on the paper sheet P in the width direction and the height direction in accordance with the dimensions LX, AX, BX, LY, AY and BY, desired spaces CX and CY (see FIG. 5) to be given in adjacent two copy areas (ST5). The available duplication numbers NX and NY are given by following equations (7) and (8).

$$NX = (LX - AX - BX + CX)/X4 \tag{7}$$

$$NY = (LY - AY - BY + CY)/Y4 \tag{8}$$

The main controller 81 then presents the available duplication numbers NX and NY on the display 100 for notifying the operator of the available duplication numbers NX and NY (ST6).

If the available duplication numbers NX and NY presented on the display 100 are satisfactory to the operator, the operator then operates the copy key on the control panel 80 to start the copying operation (ST7).

The main controller 81 sets a left margin, a read head address RT, a read end address RE and the duplication numbers NX and NY to the left margin counter 101, the read head address register 102, the read end address register 103 and the duplication number register 104 in the duplication number designator 86 (ST8 through ST11).

A paper sheet P with a prescribed size such as A4 size is fed to the platen drum 22. The leading end of the paper sheet P is fastened to the platen drum 22 by the fastener 23. Then the paper sheet P is wound on the platen drum 22 by the rotation of the platen drum 22 in the counterclockwise direction (ST12).

The first and second carriages 7 and 8 are driven by the motor 18, so that the image reading section 3 reads the character image "A" of the original O (ST13). The optical information of the character image "A" is transduced to an image signal by the phototransducer 11, as described before.

The image signal responsive to the character image "A" is processed in the control system as discussed before in reference to FIGS. 2 and 3, and in the manner as also discussed therein. That is, the A/D converter 91 converts the image signal output from the phototransducer 11 into a digital image signal. The resolution adjuster 92 processes the digital image signal from the A/D converter 91 under the control of the first sub controller 82, so that the resultant image is adjusted in its resolution. The compensator 84 normalizes the digital image signal output through the resolution adjuster 92 in reference the reference data stored in the memory 99 for compensating the shading caused by the non-uniformity of the CCD elements of the phototransducer 11. The magnification rate adjuster 85 modifies the digital image signal in response to the designated magnification rate MY, to enlarge or reduce the size of duplicated images. After these processings, the digital image signal is applied to the memory controller 87.

In the memory controller 87, a limited range of the line data of the digital image signal, i.e., the range of the line data from a reference position Yo to a position corresponding to the read end address RE in the height direction is stored in either one of the first and second line memories 111a and 111b. Other portions of the line data, e.g., a portion over the read end address RE is masked for not being stored in the first and second line memories 111a and 111b. On the other hand, the desired space CY is suitably given into the selected one of the first and second line memories 111a and 111b.

In the read phases, the left margin counter 101 applies the left margin to both the read address counter 106 and the second data masking circuit 112b, in synchronization with the horizontal synchronous signal.

As a result, the line data of the image signal output from the selected one of the first and second line memories 111a and 111b is masked in the portions corresponding to the space CY and the dimensions AY and BY by the second data masking circuit 112b.

Further, the read head address RT and the duplication number NY are loaded to the read address counter 106 and the duplication number counter 108, respectively.

When the count of the left margin is completed, the masking operation in the second data masking circuit 112b is released. Simultaneously, the read address counter 106 starts its count operation. Thus, address data generated by the read address counter 106 is applied to either one of the first and second line memories, e.g., the first line memory 111a through the address switch 110. The line data stored in the first line memory 111a is applied to the second data masking circuit 112b through the first data bus switch 113a. The line data of the first line memory 111a is then applied to the thermal printer 24 through the gradation controller 88.

When the reading operation of the line data including the space CY is completed, the read area calculator 107 applies a load signal as shown in FIG. 6 to the read address counter 106. The read address counter 106 again applies the address data to the first line memory 111a through the address switch 110. The line data stored in the first line memory 111a is applied to the second data masking circuit 112b through the first data bus switch 113a. Thus, the line data of the first line memory 111a is again applied to the thermal printer 24 through the gradation controller 88. During this course, the duplication number NY in the duplication number counter 108 is decremented by 1.

The above operation is repeatedly carried out until the duplication number NY in the duplication number counter 108 becomes 0. Thus, the duplication number counter 108 again applies the mask signal to the second data masking circuit 112b. As a result, the line data of the image signal output from the selected one of the first and second line memories 111a and 111b is masked in its remaining portion by the second data masking circuit 112b.

When the set of the above operations along the height direction has been completed, another set of operations similar to the above operations is successively carried out by using the other one of the line memories. Thus, the reading operations alternately using the first and second line memories 111a and 111b are repeatedly carried out. When the reading operations for the width X4, i.e., one set of duplicated images along the height direction are completed, the platen drum 22 is rotated for the space CX without printing operation under the control of the second sub controller 83. Then the platen drum 22 is again suspended (ST14). Simultaneously the carriages 7 and 8 of the image reading section 3 are returned to the initial positions (ST15).

Now, again the above described operations are carried out for producing the second set of the duplicated images along the height direction. During this course, the duplication number NX in the duplication number counter 108 is decremented by 1. Then, the duplicating operation for each set of the duplicated images along the height direction is repeatedly carried out until the duplication number NX in the duplication number counter 108 becomes 0 (ST16).

As a result of the above operations, the number of copies given by NX×NY, e.g., 10 pieces of duplicated copies, with the same character image "A" are produced on the paper sheet. When the duplicating operation has been completed, an ejecting process of the paper sheet P is carried out. When the number of copies produced on a piece of the paper sheet P is below an expected number of copies, the above operation is further carried out until the number of produced copies exceeds the expected number of copies (ST18).

The present invention is not limited to the above embodiment. For example, the duplicated copies can be arranged without the spaces CS and/or CY.

As described above, the present invention can provide an extremely preferable image forming apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An image forming apparatus comprising:
   means for receiving an image information;
   means for duplicating an image corresponding to the received image information on a recording medium;
   means for providing a magnification rate with respect to the received image information;
   means for calculating a number of times to duplicate repeatedly, without interference, a same image corresponding to a received image information on a one recording medium by the duplicating means, based on a size of the received image information, the size of the recording medium and the provided magnification rate; and
   means for controlling the duplicating means to repeatedly duplicate the same image on different sections of the one recording medium the number of times calculated by the calculating means at the provided magnification rate.

2. The image forming apparatus as claimed in claim 1, further comprising means for designating coordinates of the image information and means responsive to the designating means for calculating a size of the received image information.

3. The image forming apparatus as claimed in claim 2, further comprising means for determining a recording area on the recording medium to duplicate the image based on the size of the recording medium.

4. The image forming apparatus as claimed in claim 3, wherein the calculating means includes means for calculating the possible number of images of the calculated number on the recording area of the recording medium, based on the size of the received image information, the provided magnification rate and the size of the determined recording area.

5. An image forming apparatus comprising:
   means for receiving image formation;
   means for duplicating on a recording medium an image corresponding to the received image information;

means for providing a magnification rate with respect to the received image information;

means for calculating a number of images to duplicate repeatedly, without interference, on the recording medium by the duplicating means, based on a size of the received image information, a size of the recording medium and the provided magnification rate; and means for displaying the number of the possible times calculated by the calculating means.

6. The image forming apparatus as claimed in claim 5, further including means for controlling the duplicating means to repeatedly duplicate the image on divided sections of the same recording medium for a number of times corresponding to the number of times calculated by the calculating means at the provided magnification rate.

* * * * *